April 19, 1932.  J. R. SHOFFNER  1,854,276
AUTOMATIC ADJUSTING DEVICE FOR TAPERED ROLLER BEARINGS Original Filed June 3, 1929

Inventor

*John R. Shoffner*

By *Clarence A. O'Brien*
Attorney

Patented Apr. 19, 1932

1,854,276

UNITED STATES PATENT OFFICE

JOHN R. SHOFFNER, OF TIMBLIN, PENNSYLVANIA

AUTOMATIC ADJUSTING DEVICE FOR TAPERED ROLLER BEARINGS

Application filed June 3, 1929, Serial No. 368,003. Renewed September 14, 1931.

This invention relates to a novel means for automatically adjusting roller bearings, and more especially to a device for adjusting the wear rings of tapered roller bearings.

The primary object of the invention is to provide an automatic adjuster of the character described which is very simple in construction, applicable for any type of tapered roller bearing structure, durable, efficient and thoroughly reliable in use.

The invention consists in the novel construction, combination, arrangement of parts as hereinafter described and claimed.

Figure 1:
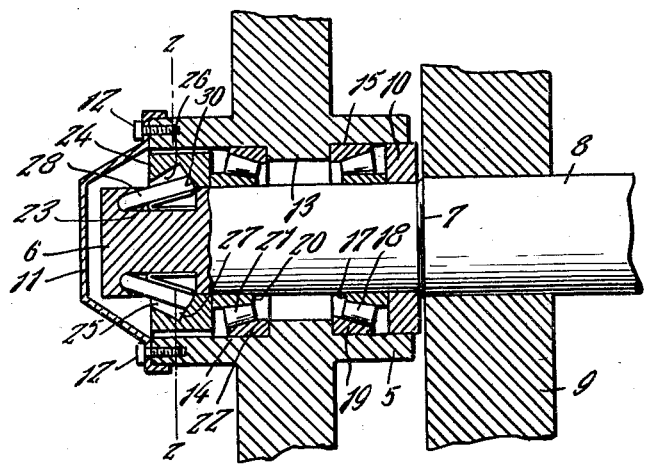
Figure 1 is a longitudinal sectional view of a roller bearing embodying the principles of my invention.
Figure 2:
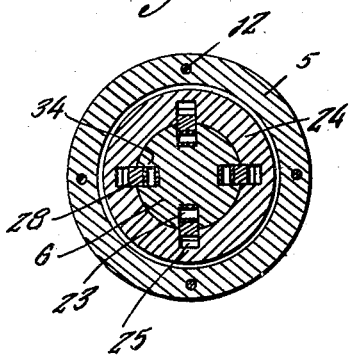
Figure 2 is a detail sectional view, taken on the line 2—2 of Figure 1.
Figure 3:
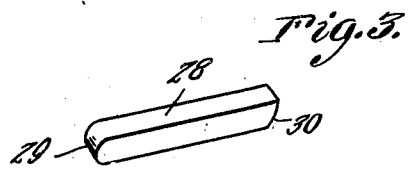
Figure 3 is a perspective view of one of the dogs embodied in my invention.
Figure 4:
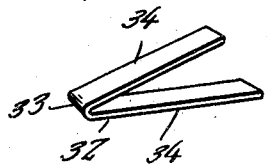
Figure 4 is a perspective view of one of the springs used for holding the dogs in position.

Referring more in detail to the drawings, the reference character 5 represents a bearing casing which may be in the form of a wheel hub or in any other desired form. Extending into the housing 5 is the journal portion 6 which terminates at a shoulder 7 on a shaft 8. The shaft 8 is suitably journaled in a supporting bearing structure 9 herein illustrated fragmentarily. A suitable bearing 10 is located at the inner end of the housing 5 and is adapted to abut the shoulder 7 on the shaft 8. The opposite end of the housing 5 is closed by means of a suitable cap 11 fixed to the housing by means of set screws 12. The housing 5 is provided with an interior rib 13, which rib 13 is formed intermediate the opposite ends of the housing. Mounted on the journal 6 is a pair of bearings indicated at 14 and 15 respectively. It will be noted that the bearing 15 is located on the shaft in position between the bearing ring 10 and between the inner face of the shoulder 13. The bearing 14 is mounted on the journal 6 and disposed on the opposite side of the shoulder 13. The bearing 15 comprises the inner race 17, the tapered bearings 18 and the outer race 19, which outer race 19 is adapted to abut the shoulder as clearly shown in Figure 1.

The bearing 14 is likewise composed of the inner race 20, tapered bearings 21 and the outer race 22, which outer race is adapted to abut the opposite side of the shoulder 13. These bearing races are of conventional construction and are merely shown to more clearly demonstrate the application of my invention.

Formed on the outer end of the journal 6 is a plurality of circumferentially spaced undercut notches 23. An adjusting ring 24 is mounted on the journal 6 adjacent its free end, and it will be seen that this bearing ring 24 is provided with circumferentially spaced notches 25 formed on the inner face thereof. These notches 25 are adapted for alignment with the notches 23 formed on the journal 6 as clearly illustrated in Figure 1. The walls of each of the notches 25 are bevelled as at 26 and 27 respectively. Within each of the undercut notches 23 is located a substantially oblong dog 28, one end of which dog is rounded as at 29, and the opposite end of the dog being somewhat bevelled as at 30. The rounded end 29 fits within the undercut of the notch 23 and the bevelled end 30 is adapted to project against the bevelled wall 28 of the respective notches 25, as clearly illustrated in Figure 1. A spring designated generally by the reference character 32 is formed of a somewhat elongated flat piece of metal bent intermediate its ends as at 33 to provide a pair of diverging arms 34.

The spring 33 is located within the undercut notch 23, and so positioned therein that one of the legs 34 rests upon the bottom wall of the box and the other leg rests against one edge of the dog 28 for normally urging the dog outwardly of the notch and into the aligned notch 25, formed in the ring 24.

In operation, during rotation of the shaft 8 and as the tapered bearings wear, the dogs 28 are forced outwardly into the notch 25 of the ring 24, by centrifugal force and also aided by the springs 33 whereby it will be seen due to the bevelled walls of the notches 25, as the dogs move inwardly of the notches, the rings 24 will be urged longitudinally of the journal 6, whereby the inner and outer races will be adjusted with respect to the bearings within the races to compensate for the wear of the said bearings.

As is obvious the outer race 19 of the bearing 15 is held stationary between the rib 13 and the bearing ring 10. Likewise the outer race 22 of the bearing 14 is held between the ribs 13 and the adjusting ring 24. Upon wear of the tapered bearings in each of the bearings 14, 15, it is obvious that the adjusting rings being forced against the outer race of the bearing 14 by means of the dog actuated as before described and the inner race 20 of the bearing 15 will be acted upon by the ring 24, whereby to take up for any looseness caused by wearing of the roller bearings, and the outer and inner bearing races of the bearing 15 likewise effected to take up looseness caused by the wearing of the bearings 18 in the race.

From the foregoing then, it will be seen that I have provided a simple, automatic adjuster for tapered bearings which will be thoroughly efficient and reliable in use. In view of the apparent simplicity of the device and from the foregoing description, a clear understanding of the operation of the same will be gleaned by those skilled in the art. A more lengthy description is therefore deemed unnecessary.

Even though I have herein shown and described certain detail structural elements, it is to be understood that the invention is susceptible of changes fully comprehended by the spirit of the invention as herein described and the scope of the appended claims.

Having thus described the invention, what I claim as new and desire to secure by Letters Patent is:—

1. In combination with tapered roller bearings, an automatic adjusting device therefor, comprising a ring adapted to abut the bearing races of the bearings, recesses formed in the ring, dogs projecting into said recesses, and means for actuating the dogs for urging the ring against the bearing races of the tapered bearing.

2. In an apparatus of the class described, the combination of a rotatable shaft, of tapered roller bearings, races for the roller bearings mounted on the shaft, an adjusting ring mounted on the shaft and adapted to abut said bearing races, said ring having beveled notches formed in the inner face thereof, undercut notches formed in the shaft and adapted for alinement with the beveled notches in the ring, dogs disposed in the undercut notches, and spring means in said undercut notches and impinging against one end of the dog for urging one end of the dog inwardly of the alined beveled notch in the ring.

3. In an apparatus of the class described, a wear compensating device for automatically adjusting tapered roller bearings comprising a plurality of spring pressed dogs adapted to be actuated by centrifugal force during rotation, and an adjustable ring engaging the races of the tapered bearing actuated by said dogs for effecting an axial movement of one of the bearing races upon wear of the tapered bearings, said ring having a plurality of radial bevelled surfaces, and said dogs having bevelled ends engaging the bevelled surfaces.

In testimony whereof I affix my signature.
JOHN R. SHOFFNER.